Jan. 22, 1963 A. W. LO 3,075,087

BISTABLE AMPLIFYING CIRCUIT EMPLOYING BALANCED PAIR OF NEGATIVE RESISTANCE ELEMENTS WITH ANODE-TO-CATHODE INTERCONNECTION

Filed Jan. 27, 1959 2 Sheets-Sheet 1

INVENTOR.
ARTHUR W. LO
BY Milton S. Winters
ATTORNEY

Jan. 22, 1963 A. W. LO 3,075,087

BISTABLE AMPLIFYING CIRCUIT EMPLOYING BALANCED PAIR OF NEGATIVE RESISTANCE ELEMENTS WITH ANODE-TO-CATHODE INTERCONNECTION

Filed Jan. 27, 1959 2 Sheets-Sheet 2

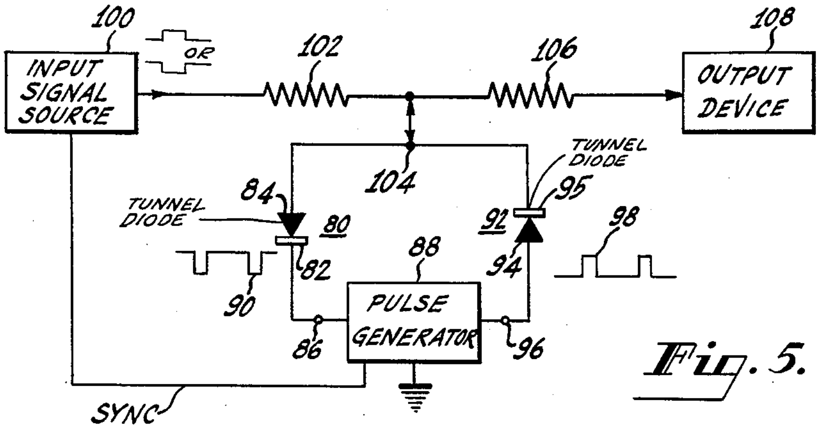

FIG. 5.

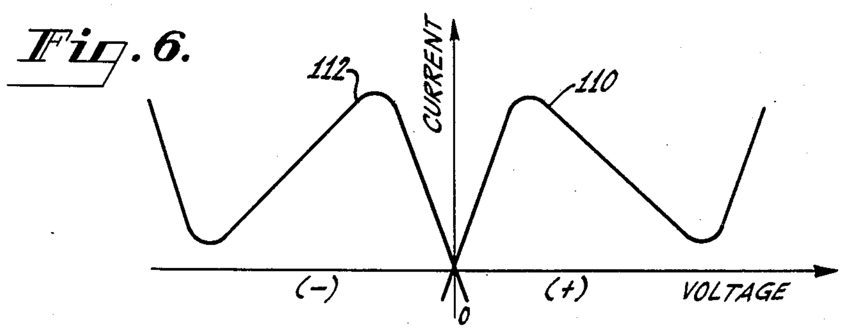

FIG. 6.

CHARACTERISTICS OF TUNNEL DIODES WHEN PULSE GENERATOR 88 OUTPUT IS ZERO.

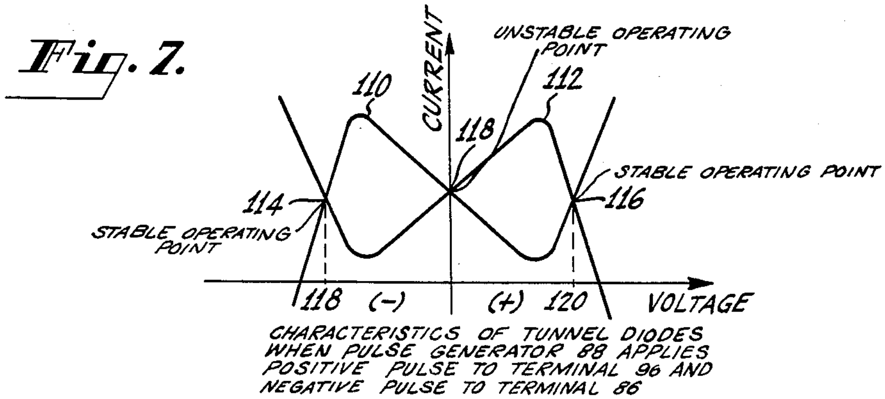

FIG. 7.

CHARACTERISTICS OF TUNNEL DIODES WHEN PULSE GENERATOR 88 APPLIES POSITIVE PULSE TO TERMINAL 96 AND NEGATIVE PULSE TO TERMINAL 86

INVENTOR.
ARTHUR W. LO
BY
Milton S. Winters
ATTORNEY

United States Patent Office 3,075,087
Patented Jan. 22, 1963

3,075,087

BISTABLE AMPLIFYING CIRCUIT EMPLOYING BALANCED PAIR OF NEGATIVE RESISTANCE ELEMENTS WITH ANODE-TO-CATHODE INTERCONNECTION

Arthur W. Lo, Fords, N.J., assignor to Radio Corporation of America, a corporation of Delaware Filed Jan. 27, 1959, Ser. No. 789,326
9 Claims. (Cl. 307—88.5)

This invention relates generally to switching circuits and more particularly to a switching circuit utilizing semiconductor devices having negative resistance characteristics.

Switching circuits in which pulse type signals are used to represent binary information are well known, and are found in abundance in digital computer systems, for example. In one type of computer system, bistable circuits are used wherein a binary "one" is represented by a pulse of one polarity, say positive, and a binary "zero" by a pulse of reverse polarity, or negative. In digital computers, or other digital information handling machines, these pulses may be required to pass through many transmission devices. In the course of successive transmissions, the pulses may become appreciably distorted. That is, their amplitude may have been attenuated and their rise and fall time increased to the point where the pulses are no longer usable. The pulses are, therefore, often periodically amplified.

In addition, in many applications it is desirable to provide bistable circuits that can be simply and reliably changed from one stable state to the other stable state each time an input signal is received, for example, in scaling and counting circuits, in triggerable flip-flop circuits, in various logic circuits, and so on. Each input signal may cause the circuit to reverse its state.

It is an object of the present invention to provide a novel and improved bistable circuit.

Another object of the present invention is to provide a novel and improved circuit which is bistable and provides power gain.

Still another object of the present invention is to provide novel and improved bistable circuits which are triggerable from one stable state to the other stable state in a simple and reliable manner.

Yet another object of the present invention is to provide improved methods of an apparatus for switching the polarity of output signal in a bistable circuit.

According to the present invention, a novel bistable circuit utilizes a pair of semiconductor devices serially connected between a source of energizing signals. Each of the semiconductor devices has a negative resistance characteristic. The energizing signal source is arranged to apply simultaneously signals of opposite polarity to the semiconductor devices, and the semiconductor devices are arranged to provide a low impedance path for these energizing signals. A low power input signal applied to a point common to the semiconductor device then determines the polarity of a higher power output signal derived from the common point, and a power gain is thus advantageously realized at the same time.

In the accompanying drawing:

FIGURE 5 is a schematic diagram of a switching circuit according to the present invention; and FIGURES 6 and 7 are graphs showing the negative resistance characteristics of the diodes used in the circuit of, and are useful in explaining the operation of, the circuit of FIGURE 5.

Figure 1:
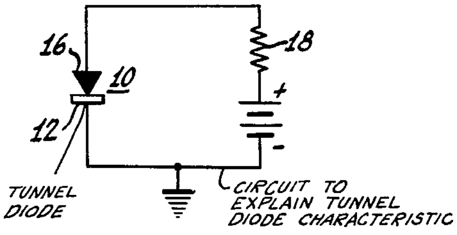
FIGURE 1 is a schematic diagram of a bistable circuit utilizing a single negative resistance diode.

It is known that a device having a characteristic in which a negative resistance portion interposed between two positive resistance portions may be used with a load to form a bistable circuit. FIGURE 1 shows, for purposes of explanation only, a type of bistable circuit which utilizes a diode as a negative resistance element. A suitable diode for this purpose is called a tunnel diode. Diodes of this type are more fully described in the copending application of Henry S. Sommers, Jr., Serial No. 789,286, filed January 27 ,1959, for "Semiconductor Devices and Methods of Preparation Thereof," and assigned to the same assignee as the present invention. The circuit comprises a tunnel diode 10 having a cathode 12 and an anode 16, with the anode 16 connected through a load resistor 18 to the positive terminal of a bias battery 14. The cathode 12 of the diode 10 and the negative terminal of the bias battery 14 are both connected to circuit ground. The tunnel diode 10 is thus forward biased.

Figure 2:
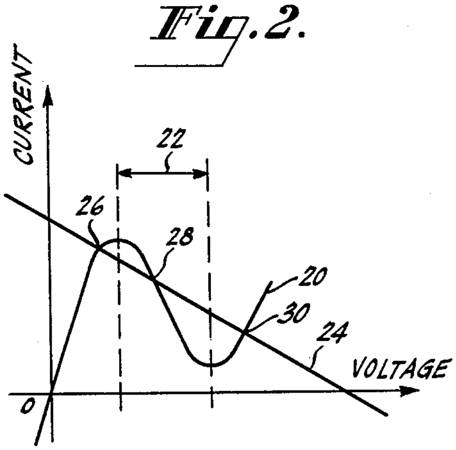
FIGURE 2 is a graph showing the negative resistance characteristic of the diode in the circuit of FIGURE 1 and is useful in explaining the operation of this circuit.

FIGURE 2 is a graph showing the operating characteristics of this circuit. A curve 20 illustrates the volt-ampere characteristic of a forward biased tunnel diode, and clearly indicates therein a voltage controlled negative resistance region 22 indicated by a pair of dotted lines. The curve 20 is simply obtained by plotting the voltage across the tunnel diode 10 as a function of the current through it.

A load line 24 whose slope is determined by the size of the load resistor 18 is drawn on the graph of FIGURE 2, and intersects the curve 20. By properly selecting the load resistor 18, the load line is made to intersect the curve 20 in three points 26, 28, and 30. Points 26 and 30 intersect the curve 20 in positive resistance regions and therefore are points of stable operation. That is, the circuit of FIGURE 1 can be maintained quiescently at these operating points. The intersection point 28 is in the negative resistance region and thus the circuit cannot be maintained quiescently at this operating point, which is a point of unstable equilibrium. The circuit is therefore bistable, or has two stable operating states. When the circuit is in the state represented by the operating point 26, the voltage across the diode is relatively low, and when the circuit is in the state represented by the operating point 30, the voltage across the diode is relatively high.

In operation, assume the initial quiescent operating point is at 26. If a positive triggering pulse voltage of sufficient amplitude is applied in series with the load, the circuit switches very rapidly to the operating point 30. The operating point may remain at point 30 indefinitely, until some external disturbance is received. When the circuit is operating at the point 30, negative triggering pulse applied in series with the load switches the circuit operating point back to the first quiescent point 26.

Figures 3, 4:
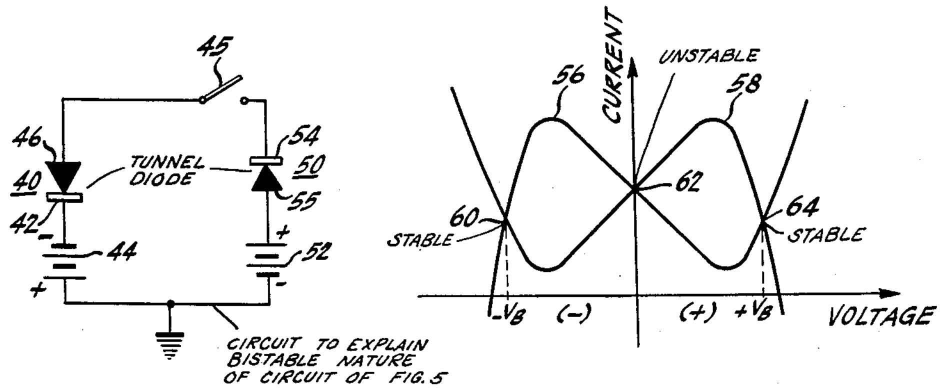
FIGURE 3 is a schematic diagram of another type of bistable circuit using a pair of negative resistance diodes.
FIGURE 4 is a graph showing the negative resistance characteristics of the diodes in the circuit of FIGURE 3 and is useful in explaining the operation of this circuit.

Another type of bistable circuit is shown in FIGURE 3 for explanation purposes only, and utilizes a pair of forward biased tunnel diodes. Each diode in this circuit may be considered as a load element for the other diode. A first tunnel diode 40 having a cathode electrode 42 and an anode electrode 46 is forward biased by connecting the cathode electrode 42 to the negative terminal of a bias battery 44, with the positive terminal of the battery connected to circuit ground. The anode 46 of the tunnel diode 40 is connected through a one terminal of a switch 45 to a series combination of a second tunnel diode 50, having a cathode electrode 54 and an anode electrode 56, and its bias battery 52. The tunnel diode 50 is forward biased by connecting the anode electrode 54 to a positive terminal of the battery 52 with the negative terminal of the battery being connected to circuit ground. The cathode electrode 54 is connected to the other terminal of the switch 45.

The operation of this circuit may be understood by referring to FIGURE 4. If the switch 45 is open and the voltage drop between circuit ground and the anode 46 of the tunnel diode 40 is measured as a function of the current through the diode, a characteristic curve such as that shown at 56 is obtained. This is the same type of negative resistance characteristic as shown heretofore in FIGURE 2 but shifted along the negative voltage axis by an amount determined by the value of the bias battery 44. In a similar manner, if the voltage drop between circuit ground and the cathode electrode 54 of the tunnel diode 50 is measured as a function of the current through it, a characteristic curve such as shown at 58 is obtained. The curve 58 is shifted along the positive voltage axis by an amount determined by the value of the battery 52. If the diodes were perfectly matched, then the curve 58 would be a mirror image of the curve 56.

The curves 56 and 58 intersect at three points, 60, 62 and 64. The intersection point 62 occurs in the negative resistance region of both the curves 56 and 58 and is therefore not a stable operating point, while the intersection points 60 and 64 occur in positive resistance regions and are stable operating points. On closing the switch 45, the circuit may rest quiescently at either of the operating points 60 or 64, but not at the operating point 62. As can be seen from the curve, at stable operating point 60, diode 40 is in its low voltage stable state and diode 50 is in its high voltage stable state while at stable operating point 64, diode 50 is in its low voltage stable state and diode 40 is in its high voltage stable state. Thus, if the switch 46 is closed and a voltmeter applied between circuit ground and the point common to the diodes, a voltage about equal to that shown as $-V_b$ or $+V_b$ in FIGURE 4 is measured. If there is perfect symmetry in the circuit, then there is an equal probability of the circuit resting at either of the operating points 60 or 64. However, an external influence, such as noise or an applied triggering voltage could easily upset the symmetry and dictate the final operating point. This fact is used in the design of the novel circuit shown in FIGURE 5.

A novel switching circuit utilizing the principles described heretofore is shown in FIGURE 5 in accordance with the present invention. In this circuit a pulse generator 88 is arranged to supply opposite polarity energizing pulses to a pair of tunnel diodes 80 and 92. These pulses are of proper polarity to forward bias the diodes. Positive pulses such as are shown at 98 are obtained at one terminal 96 of the pulse generator 88, and negative pulses such as are shown at 90 are simultaneously obtained at a second terminal 86 of the pulse generator. The tunnel diode 80 has a cathode electrode 82 and an anode electrode 84, and the tunnel diode 92 has a cathode electrode 95 and an anode electrode 94. The terminal 86 of the pulse generator 88 is connected to the cathode electrode 82 of the tunnel diode 80 to apply energizing signals thereto. In a like manner, the terminal 96 of the pulse generator 88 is connected to the anode electrode 94 of the tunnel diode 92. To complete the series path between the diodes and the pulse signal source, the anode electrode 84 and the cathode electrode 95 of the diodes 80 and 92 are connected together. An input signal source 100 supplies information or switching signals to the circuit and is connected through an isolation resistor 102 to a common junction 104 between the tunnel diodes. An output signal is derived from the junction 104 and is applied through an isolating resistor 106 to an output device 108. The output device may be a logic circuit in a digital computer, for example. In order that the input signal source 100 applies input signals just prior to the application of the energizing signals from the pulse generator 88, a synchronization system may be included between these signal sources.

The operation of this circuit can be better understood by referring to FIGURES 6 and 7. The curves shown in FIGURE 6 illustrate the operating condition of the circuit when energizing pulses from the pulse generator 88 are not applied to the tunnel diodes. Two curves 110 and 112 shown therein represent the individual volt-ampere characteristics of the tunnel diodes 80 and 92. Since the diodes are inserted in the circuit in an opposite sense when looking toward the diodes from the terminal 104, the characteristic curves 110, 112 appear as mirror images of one another. In the absence of energizing pulses, no output voltage is obtained at the common junction 104. That is, the terminal 104 is at ground potential. When the pulse generator 88 is energized and supplies forward biasing pulse voltages to the tunnel diodes, then the operating conditions of the circuit appear as shown in FIGURE 7. This figure is identical to FIGURE 4 which was discussed heretofore. That is, the application of the pulse voltages 90 and 98 to the tunnel diodes 80 and 92 in effect shifts the curve 110 in the direction of the negative voltage axis, and shifts the curve 112 in the direction of the positive voltage axis. Under these circumstances there are only two stable operating points possible as discussed heretofore, namely the points 114 and 116. The intersection point 118 is an unstable one since it is in the negative resistance region of the characteristics. That is, at the terminal 104 either a positive or a negative voltage is obtained. If there is perfect symmetry in the circuit, then it is equally probable that the circuit will rest at either the operating point 114 or the operating point 116. An external influence, however, can easily upset the symmetry and dictate the final operating point. Thus, the input signal source 100 is arranged to apply a low power signal at the common junction 104 just prior to the application of the energizing pulses from the pulse generator 88. The polarity of the input signal applied to the junction 104 by the input signal source then dictates the polarity of the output voltage.

It has been found that power needed from the input signal source to determine the polarity of the output signal may be only a small fraction of the output power. Therefore, if the input signal source is run in synchronism with the pulse generator, a small power input signal controls a large power output signal. In practice, the input power from the input signal source 100 should be high enough to offset any unavoidable imperfection in symmetry between the tunnel diodes 80 and 92. Under these circumstances, high power gain is achieved.

Tunnel diodes are particularly useful in this circuit since they are capable of being switched very rapidly and, in addition, are two terminal devices which result in a circuit of reduced wiring complexity. Other semiconductor devices having negative resistance characteristics, such as point contact transistors may, however, be used in this circuit.

The novel circuit of the invention therefore provides a novel bistable circuit in which an input signal functions as a locking signal to provide one or the other of two distinct output states, and a pulse generator provides energizing signals to achieve power gain in the circuit. The specific configuration discussed, which includes two tunnel diodes connected anode-to-cathode, and a common input-output terminal at said anode-to-cathode connection, is now known as a "balanced pair" or "locked pair."

What is claimed is:

1. In combination, a pair of tunnel diodes connected anode-to-cathode; a terminal common to said anode and cathode; a source supplying forward voltage to the two diodes at a level such that one can assume its high voltage state and the other its low voltage stage; and means connected to said terminal for applying control pulses of positive or negative polarity thereto concurrently with the application of said forward voltage, whereby an applied positive-going pulse causes one diode to be placed in its high voltage state and the other in its low voltage state, and an applied negative going pulse causes two diodes to reverse their stable states.

2. In combination, a pair of negative resistance diodes of the type capable of assuming one of two stable voltage states connected anode-to-cathode; means coupled to the diodes for applying a voltage in the forward direction to the diodes at a level such that one can assume its high voltage state and the other in its low voltage state; a signal terminal at said anode-to-cathode connection; means for applying a control signal to said terminal; and means for deriving an output at said terminal.

3. In combination, a pair of negative resistance diodes connected anode-to-cathode, each capable of assuming one of two stable states; means for applying energizing pulses to said pair of diodes at an amplitude to place one in one stable state and the other in its other stable state; and means for applying a pulse of either polarity to the anode-to-cathode connection of said diodes, the polarity of said pulse determining which diode assumes which state.

4. In combination, a pair of diodes which exhibit a negative resistance in response to a forward current of greater than a given amplitude connected with the anode of the first diode connected to the cathode of the second; means for concurrently applying negative pulses to the cathode of the first diode and positive pulses to the anode of the second diode, whereby current flows in the forward direction through both diodes; and means for applying pulses to the common anode-to-cathode connection of the diodes concurrently with the application of said positive and negative pulses, the polarity of the pulses applied to said common anode-to-cathode connection determining which diode assumes which state.

5. In combination, a pair of semiconductor diodes each exhibiting a negative resistance in response to a forward current of greater than a given amplitude and each capable of assuming one of two stable states; an ohmic connection between the anode of one diode and the cathode of the other diode; means for applying a forward voltage across the circuit of said two diodes at a level sufficient to place one in one stable state and the other in the other stable state; means for applying a pulse signal to said ohmic connection; and means for obtaining an amplified signal from said ohmic connection.

6. In combination, a pair of tunnel diodes; an ohmic connection between the anode of one diode and the cathode of the other; means connected across the cathode of said one diode and anode of the other for applying 180° out-of-phase balanced alternating voltages to said diodes; means for obtaining an output signal from said ohmic connection when said applied voltage forward biases said diodes; and means for controlling the polarity of said output signal including means for applying an input signal to said ohmic connection.

7. A balanced pair comprising two tunnel diodes connected anode-to-cathode; means for applying 180° out-of-phase, symmetrical, alternating voltages across the two diodes at a level to forward bias both diodes during one portion of the cycle of the alternating voltage; a pair of common input-output terminals, one at said anode-to-cathode connection, and the other connected to ground; and means for applying current pulses of desired polarity to said common terminal concurrently with said one portion of said cycle for causing a desired one of said diodes to assume its high voltage state.

8. A balanced pair comprising two tunnel diodes connected anode-to-cathode; means for applying 180° out-of-phase, symmetrical, alternating voltages across the two diodes at a level to forward bias both diodes during one portion of the cycle of the alternating voltage; and means for applying a signal of desired polarity to the anode-to-cathode connection to the two diodes during the time the two diodes are forward biased.

9. In combination, a pair of negative resistance diodes of the voltage controlled type connected anode-to-cathode; means for applying voltages to the diodes at a level to place one in its high voltage stable state and the other in its low voltage stable state; and means for applying a signal to the common anode-to-cathode connection of said diodes concurrently with the application of said voltages to said diodes which signal, if of one polarity, causes one of the diodes to assume its high voltage state and, if of opposite polarity, causes the other of the diodes to assume its high voltage state.

References Cited in the file of this patent

UNITED STATES PATENTS

| | | |
|---|---|---|
| 2,122,748 | Mayer | July 5, 1938 |
| 2,418,516 | Lidlow | Apr. 8, 1947 |
| 2,581,273 | Miller | Jan. 1, 1952 |
| 2,614,140 | Kreer | Oct. 14, 1952 |
| 2,651,728 | Wood | Sept. 8, 1953 |
| 2,655,610 | Ebers | Oct. 13, 1953 |
| 2,837,652 | Nailen | June 3, 1958 |
| 2,877,359 | Ross | Mar. 10, 1959 |

FOREIGN PATENTS

| | | |
|---|---|---|
| 166,800 | Australia | Feb. 6, 1956 |

OTHER REFERENCES

Electronics, February 1946, pages 118–123.

Esaki Phys. Rev., 109; 603–4, January 1958.

Electronics, Aug. 7, 1959, vol. 32, No. 32, page 61.